W. N. CORNELL & C. TOLLNER.
Reducing Wood to Paper-Stock.

No. 220,808.  Patented Oct. 21, 1879.

UNITED STATES PATENT OFFICE.

WILLIAM N. CORNELL AND CHARLES TOLLNER, OF PULASKI, NEW YORK.

IMPROVEMENT IN REDUCING WOOD TO PAPER-STOCK.

Specification forming part of Letters Patent No. 220,808, dated October 21, 1879; application filed September 27, 1879.

*To all whom it may concern:*

Be it known that we, WILLIAM N. CORNELL and CHARLES TOLLNER, both of Pulaski, in the county of Oswego and State of New York, have invented a new and useful Improvement in Reducing Wood-Stock for Paper-Pulp; and we do hereby declare that the following is a full and exact description of the same, reference being had to the accompanying drawings, and to the letters of reference marked thereon.

The object of our invention is an improved method of reducing wood to stock for paper-pulp, by which the length of the fibers torn from the wood by the action of reciprocating saws can be regulated so that fiber of the exact length desired can be produced, and the trouble of reducing fiber of excessive length avoided; and our invention consists in presenting the blocks or pieces of wood to the saws in the same plane as the saws, but in a diagonal direction.

Heretofore we have proposed to regulate the length of the fiber by presenting the block of wood horizontally at a small angle to the plane of the reciprocating saws and cutting the wood lengthwise of the grain; and for that purpose we have constructed a machine and applied for a patent thereon, and said application was allowed July 24, 1878.

As an improvement upon that machine we now design to present the wood to the saws on the same or parallel plane, but laterally diagonally, by which means the length of the fiber can be regulated.

When the block is presented to the saw on the same plane, if the saws cut with the grain, a fiber of excessive length is produced, which has to be reduced in length before being used as paper-stock; and if the saws cut directly across the grain the product will be sawdust, or fiber too short for satisfactory use, whereas if the wood were presented diagonally the angle could be changed and varied to produce fiber of the exact length desired, and the proper angle could be easily ascertained by experiment.

Figure 1:
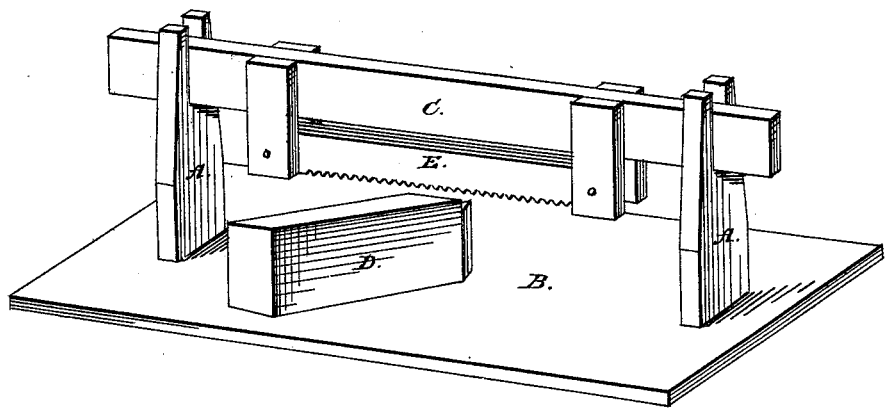
Figure 2:
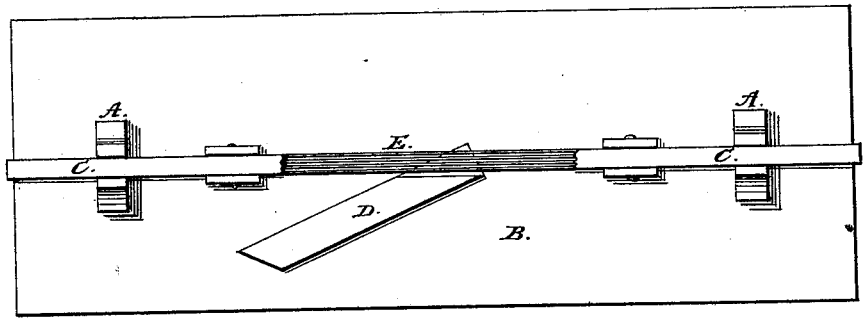

To perform this work we have constructed a machine, which is represented in the accompanying drawings, where Figure 1 is a perspective view, and Fig. 2 is a partial top view, with part of the saw-frame removed.

Referring to those drawings, A A are two upright standards set in a bed-piece, B. The standards A A are slotted to receive the ends of the saw-frame C, which has depending from it hangers, E, in which are secured any number of saws, E, in close proximity to one another. The saws and frame are caused to reciprocate in any convenient way.

D is a block of wood, which is presented to the action of the saws on a parallel plane with them, but at an angle laterally to their course, and a reciprocating motion being imparted to the saws, fibers in length corresponding to the angle at which they are placed, and in number to the number of saws used, are torn from the block. Experience will, of course, soon determine the proper angle at which the wood should be placed, as the length of fiber will always correspond.

What we claim as our invention is—

In reducing wood to stock for paper-pulp, the method of presenting the wood to the action of reciprocating saws on parallel planes, but laterally diagonal to the course of such saws, substantially as and for the purpose set forth.

This specification signed and witnessed this 29th day of August, 1878.

WM. N. CORNELL.
CHARLES TOLLNER.

Witnesses:
W. B. DIXSON,
J. W. RICHARDS.